United States Patent
Brothers et al.

(10) Patent No.: US 7,373,982 B2
(45) Date of Patent: May 20, 2008

(54) CEMENTS FOR USE ACROSS FORMATIONS CONTAINING GAS HYDRATES

(75) Inventors: Lance E. Brothers, Chickasha, OK (US); Fouad Fleyfel, Katy, TX (US); James F. Heathman, Katy, TX (US); Ali Shinta, deceased, late of Missouri City, TX (US); by Shada Salih, legal representative, Missouri City, TX (US)

(73) Assignee: Halliburton Energy Services, Inc., Duncan, OK (US)

(*) Notice: Subject to any disclaimer, the term of this patent is extended or adjusted under 35 U.S.C. 154(b) by 0 days.

(21) Appl. No.: 11/385,416

(22) Filed: Mar. 21, 2006
(Under 37 CFR 1.47)

(65) Prior Publication Data
US 2007/0221378 A1    Sep. 27, 2007

(51) Int. Cl.
*E21B 33/13* (2006.01)

(52) U.S. Cl. ..................................... 166/293

(58) Field of Classification Search ............ None
See application file for complete search history.

(56) References Cited

U.S. PATENT DOCUMENTS

| | | | |
|---|---|---|---|
| 3,179,528 A | 4/1965 | Holmgren et al. |
| 3,582,376 A | 6/1971 | Ames |
| 3,688,845 A | 9/1972 | Messenger |
| 3,891,454 A | 6/1975 | Cunningham et al. |
| 3,937,282 A | 2/1976 | Shyrock et al. |
| 4,054,461 A | 10/1977 | Martin |
| 4,302,251 A | 11/1981 | Udagawa et al. |
| 4,482,379 A | 11/1984 | Dibrell et al. |
| 4,482,384 A | 11/1984 | Miller |
| 4,761,183 A | 8/1988 | Clarke |
| 5,076,364 A | 12/1991 | Hale et al. |
| 5,346,550 A | 9/1994 | Kunzi et al. |
| 5,370,181 A | 12/1994 | Nahm et al. |
| 5,421,409 A | 6/1995 | Mueller et al. |
| 5,447,198 A | 9/1995 | Kunzi et al. |
| 5,547,505 A | 8/1996 | Nakatsu et al. |
| 5,569,324 A | 10/1996 | Totten et al. |
| 5,588,489 A | 12/1996 | Chatterji et al. |
| 5,685,903 A | 11/1997 | Stav et al. |
| 5,718,759 A | 2/1998 | Stav et al. |
| 5,858,083 A | 1/1999 | Stav et al. |
| 5,913,364 A | 6/1999 | Sweatman |
| 6,060,434 A | 5/2000 | Sweatman et al. |
| 6,068,055 A | 5/2000 | Chatterji et al. |
| 6,152,227 A | 11/2000 | Lawson et al. |
| 6,167,967 B1 | 1/2001 | Sweatman |
| 6,231,664 B1 | 5/2001 | Chatterji et al. |
| 6,258,757 B1 | 7/2001 | Sweatman et al. |
| 6,521,039 B2 | 2/2003 | Stroup et al. |
| 6,561,273 B2 | 5/2003 | Brothers et al. |
| 6,562,122 B2 | 5/2003 | Dao et al. |
| 6,689,208 B1 | 2/2004 | Brothers |
| 6,776,237 B2 | 8/2004 | Dao et al. |
| 6,904,971 B2 | 6/2005 | Brothers et al. |
| 6,908,508 B2 | 6/2005 | Brothers |
| 2005/0056191 A1 | 3/2005 | Brothers et al. |
| 2006/0020145 A1* | 1/2006 | Lal et al. ................. 562/18 |
| 2007/0221379 A1 | 9/2007 | Brothers et al. |

FOREIGN PATENT DOCUMENTS

| | | |
|---|---|---|
| WO | WO 2006/129121 | 12/2006 |
| WO | WO 2006/129122 | 12/2006 |

OTHER PUBLICATIONS

Foreign Communication from a related counterpart Application dated Jul. 3, 2007.
Office Action dated Apr. 12, 2007 (14 pages), U.S. Appl. No. 11/385,426 filed on Mar. 21, 2006.
Office Action dated Sep. 21, 2007 (18 pages), U.S. Appl. No. 11/385,426 filed on Mar. 21, 2006.
United States Gypsum Company, Material Safety Data Sheet, Ultracal® 30 Gypsum Cement, Oct. 1, 1999, pp. 1-4, MSDS No. 05350, Version 3, Chicago, IL.

* cited by examiner

*Primary Examiner*—Jennifer H. Gay
*Assistant Examiner*—Kerry W. Leonard
(74) *Attorney, Agent, or Firm*—Craig W. Roddy; Conley Rose, P.C.

(57) ABSTRACT

A method of servicing a wellbore in a subterranean formation, comprising preparing a cement composition comprising water, a cementitious material, and a gas hydrate inhibitor, and placing the cement composition in the wellbore. A cement composition comprising water, a cementitious material, and a gas hydrate inhibitor.

21 Claims, No Drawings

CEMENTS FOR USE ACROSS FORMATIONS CONTAINING GAS HYDRATES

CROSS-REFERENCE TO RELATED APPLICATIONS

The subject matter of the present application is related to U.S. patent application Ser. No. 11/385,426 filed on Mar. 21, 2006 and entitled "Low Heat of Hydration Cement Compositions and Methods of Using Same," which is hereby incorporated herein by reference in its entirety for all purposes.

STATEMENT REGARDING FEDERALLY SPONSORED RESEARCH OR DEVELOPMENT

Not applicable.

BACKGROUND OF THE INVENTION

1. Field of the Invention

This invention relates to servicing a wellbore. More specifically, it relates to servicing a wellbore with cement compositions having a gas hydrate inhibitor and methods of using same.

2. Background of the Invention

Natural resources such as gas, oil, and water residing in a subterranean formation or zone are usually recovered by drilling a wellbore down to the subterranean formation while circulating a drilling fluid in the wellbore. After terminating the circulation of the drilling fluid, a string of pipe, e.g., casing, is run in the wellbore. The drilling fluid is then usually circulated downward through the interior of the pipe and upward through the annulus, which is located between the exterior of the pipe and the walls of the wellbore. Next, primary cementing is typically performed whereby a cement slurry is placed in the annulus and permitted to set into a hard mass (i.e., sheath) to thereby attach the string of pipe to the walls of the wellbore and seal the annulus. Subsequent secondary cementing operations may also be performed.

The completion of subterranean wellbores in fragile geographic zones such as in permafrost poses particular challenges. Permafrost is defined as soil that stays in a frozen state for more than two years. Cement compositions for use for in subterranean formations within zones of permafrost must be designed to set before freezing and have a low heat of hydration. In addition to destabilizing the formation, high heats of hydration promote the evolution of gas from hydrates (e.g. methane hydrate) that may be present in large amounts in permafrost. Gas hydrates, for example methane hydrate, are metastable and can easily dissociate.

Thus there is an ongoing need for cement compositions that inhibit the dissociation of gas hydrates and/or have a low heat of hydration.

BRIEF SUMMARY OF SOME OF THE PREFERRED EMBODIMENTS

Disclosed herein is a method of servicing a wellbore in a subterranean formation, comprising preparing a cement composition comprising water, a cementitious material, and a gas hydrate inhibitor, and placing the cement composition in the wellbore.

Also disclosed herein is a cement composition comprising water, a cementitious material, and a gas hydrate inhibitor.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

DETAILED DESCRIPTION OF THE PREFERRED EMBODIMENTS

Disclosed herein are cement compositions comprising water, a cementitious material, and at least one gas hydrate inhibitor. Further disclosed herein are methods of preparing and using such compositions. The cement compositions disclosed herein may be employed in the servicing of a wellbore and may advantageously inhibit the dissociation of gas hydrates within fragile geographic regions containing gas hydrates.

In an embodiment, the cement composition comprises a gas hydrate inhibitor. Said gas hydrate inhibitor may function to reduce the dissociation of gas hydrates in a formation and thus prevent the production of gas. When such gases are produced they may migrate through the cement slurry thereby creating channels through the cement and may pose safety concerns such as with the evolution of an explosive gas (e.g., methane). In an embodiment, the gas hydrate inhibitor is any compound capable of inhibiting the dissociation of gas hydrates and compatible with the other components of the composition. In an embodiment, the gas hydrate inhibitor is phosphotidylcholine also known as lecithin. Lecithin may be present in the cement composition in amounts of from about 0.1% by weight of mix water (bww) to about 5% bww, alternatively from about 0.3% bww to about 2% bww, alternatively from about 0.4% bww to about 1.0%. Lecithin is widely commercially available and methods for the inclusion of lecithin in a cement composition are known to one of ordinary skill in the art.

The cement composition may comprise a cementitious material, for example a hydraulic cement. Hydraulic cement refers to a powdered material that develops adhesive qualities and compressive strength when cured with water. In an embodiment, the cement composition comprises a hydraulic cement such as a cement that includes calcium, aluminum, silicon, oxygen, and/or sulfur and which sets and hardens by reaction with the water. Examples of such cements include but are not limited to Portland cements (e.g., classes A, C, G, and H Portland cements), pozzolana cements, gypsum cements, phosphate cements, high alumina content cements, silica cements, high alkalinity cements, and combinations thereof. In an alternative embodiment, the cementitious material may comprises blast furnace slag, vitrified shale, calcium sulfate hemi-hydrate or combinations thereof, and such materials may be in addition to or in lieu of the hydraulic cements described above.

Commercially available calcium sulfate hemi-hydrate also represented herein by the formula ($CaSO_4 \cdot \frac{1}{2}(H_2O)$), is a mixture of powdered and heat-treated gypsum which can be mixed with water resulting in hardening of the plaster of paris to a smooth solid that does not shrink or lose volume because it hardens before all the water can evaporate. Calcium sulfate hemi-hydrate is widely available commercially from suppliers such as U.S. Gypsum and Georgia Pacific. BFS appears as the upper surface layer of molten iron released from a blast furnace. The slag is separated from the iron and is considered a co-product of the production of iron and steel. BFS is a nonmetallic product consisting essentially of silicates, aluminosilicates of calcium, and other compounds that are developed in a molten condition simultaneously with the iron in the blast-furnace. BFS is widely available commercially. Shale is a fine-grained sedimentary rock whose original constituents were clays or muds. It is characterized by thin laminae breaking with an irregular curving fracture, often splintery, and parallel to the often indistinguishable bedding planes. The shale may then be subjected to the process of vitrification followed by being ground or milled to a desired particle size. Herein vitrification refers to heating of the material to a temperature that promotes the conversion of the shale into a glass-like amorphous solid which is free of any crystalline structure.

The addition of BFS, calcium sulfate hemihydrate, vitrified shale or combinations thereof may function to reduce the heat evolved when the cement composition is contacted with an aqueous fluid and begins to absorb water or hydrate (i.e. heat of hydration) in comparison to an otherwise identical cement composition lacking said compounds. This is described in more detail in U.S. patent application Ser. No. 11/385,426 filed on Mar. 21, 2006 and entitled "Low Heat of Hydration Cement Compositions and Methods of Using Same," which is incorporated by reference herein in its entirety.

In an embodiment BFS is present in the cement composition in amounts of from about 20% to about 80%. In an embodiment calcium sulfate hemihydrate is present in the cement compositions in amounts of from about 20% to about 80%. In yet another embodiment, vitrified shale is present in the cement compositions in amounts of from about 35% to about 65%.

In an embodiment, the cement composition includes a sufficient amount of water to form a pumpable slurry. The water may be fresh water or salt water, e.g., an unsaturated aqueous salt solution or a saturated aqueous salt solution such as brine or seawater. The water may be present in the amount from about 20 to about 180 percent by weight of cement, alternatively from about 28 to about 60 percent by weight of cement.

In some embodiments, additives may be included in the cement composition for improving or changing the properties thereof. Examples of such additives include but are not limited to salts, accelerants, surfactants, set retarders, defoamers, settling prevention agents, weighting materials, dispersants, formation-conditioning agents, or combinations thereof. Other mechanical property modifying additives, for example, are carbon fibers, glass fibers, metal fibers, minerals fibers, and the like which can be added to further modify the mechanical properties. These additives may be included singularly or in combination. Methods for introducing these additives and their effective amounts are known to one of ordinary skill in the art.

In an embodiment, the cement composition comprises a density-reducing additive. Density-reducing additives such as glass beads or foam and expanding additives such as foaming surfactants gas, suspension aids, defoamers and the like may be included in the cement composition to generate a lightweight cement slurry. In some embodiments, the choice of a density-reducing additive may be dependent on the viscosity of the cement composition. Amounts of such density-reducing additives and methods for their inclusion are known to one of ordinary skill in the art. In an embodiment, the cement composition is a foamed cement. As will by understood by one of ordinary skill in the art the inclusion of a density reducing additive such as foam into the cement compositions of this disclosure may display a reduced heat of hydration due to the reduced mass per unit volume. In various embodiments, the cement composition may comprise a density greater than or equal to about 10 lb/gallon. In an embodiment, a cement slurry mixed at a density of 15.2 lb/gal has a thermal conductivity value of 0.5016 BTU/hr-ft-F° while the same slurry foamed to 10.85 lb/gal has a reduced thermal conductivity value of 0.3609 BTU/hr-ft-F°.

In some embodiments, the cement composition may comprise a retarder. Herein a retarder refers to a chemical additive used to increase the thickening time of the cement composition. The thickening time refers to the time required for the cement composition to achieve 70 Bearden units of Consistency (Bc). At about 70 Bc, the slurry undergoes a conversion from a pumpable fluid state to a non-pumpable paste. Methods for the determination of thickening time are outlined in API specification 10. Set retarders may be included by the user by methods and in amounts known to one of ordinary skill in the art. Alternatively, such retarders may be part of the commercially available formulations of other components of the disclosed cement composition. Without limitation, an example of a set retarder is sodium citrate.

The components of the cement composition may be combined in any order desired by the user to form a slurry that may then be placed into a wellbore. The components of the cement composition may be combined using any mixing device compatible with the composition, for example a bulk mixer. In an embodiment, the components of the cement composition are combined at the site of the wellbore. Alternatively, the components of the cement composition are combined off-site and then later used at the site of the wellbore. Methods for the preparation of such slurries are known to one of ordinary skill in the art.

The cement compositions disclosed herein can be used for any purpose. In an embodiment, the cement composition is used to service a wellbore that penetrates a subterranean formation. It is to be understood that "subterranean formation" encompasses both areas below exposed earth and areas below earth covered by water such as ocean or fresh water. In an embodiment, a LHCC is used to service a wellbore penetrating a fragile geographic zone, for example a wellbore in permafrost and/or a formation having gas hydrates.

Servicing a wellbore includes, without limitation, positioning the cement compositions disclosed herein in the wellbore to isolate the subterranean formation from a portion of the wellbore; to support a conduit in the wellbore; and to seal an annulus between the wellbore and an expandable pipe or pipe string. The cement compositions disclosed herein may withstand substantial amounts of pressure, e.g., the hydrostatic pressure of a drilling fluid or cement slurry, without being dislodged or extruded. Methods for introducing compositions into a wellbore to seal subterranean zones are described in U.S. Pat. Nos. 5,913,364; 6,167,967; and 6,258,757, each of which is incorporated by reference herein in its entirety.

In an embodiment, the cement compositions disclosed herein may be employed in well completion operations such as primary cementing operations. Said compositions may be placed into an annulus of the wellbore and allowed to set such that it isolates the subterranean formation from a different portion of the wellbore. The cement composition thus forms a barrier that prevents fluids in that subterranean formation from migrating into other subterranean formations. Within the annulus, the fluid also serves to support a conduit, e.g., casing, in the wellbore.

In other embodiments, additives are also pumped into the wellbore with the cement compositions. For instance, fluid absorbing materials, particulate materials, organophilic clay, resins, aqueous superabsorbers, viscosifying agents, suspending agents, dispersing agents, fluid loss agents, mechanical property modifying agents such as fibers, elastomers or combinations thereof can be pumped in the stream with the compositions disclosed.

EXAMPLES

The invention having been generally described, the following examples are given as particular embodiments of the invention and to demonstrate the practice and advantages thereof. It is understood that the examples are given by way of illustration and are not intended to limit the specification of the claims in any manner. In the following examples, heat of hydration measurements were recorded by placing a temperature recording thermocouple in an insulated silver-plated borosilicate glass vacuum flask and completely filling the flask with the slurry composition. Thickening time tests, compressive strength determinations and rheology measurements were conducted in accordance with procedures outlined in API Specification 10.

Example 1

The effect of slurry viscosity on a Slag/hemi-hydrate cement composition was determined, as shown in Table 1 in the presence and absence of lecitihin. The cement composition may also contain CFR-3 cement dispersant, which is a dispersing agent commercially available from Halliburton Energy Services. The calcium sulfate hemi-hydrate used in these compositions were obtained from Georgia Pacific unless otherwise noted.

TABLE 1

| Hemi-hydrate:Slag | Water/Cement | Lecithin % bww[1] | CFR-3 % bwc[2] | Fann readings 600-300-200-100 |
|---|---|---|---|---|
| 6:4 | 0.44 | 0.57 | 0 | 300+ 300+ --- ---- |
| 6:4 | 0.50 | 0.57 | 0 | 187-157-143-126 |
| 6:4 | 0.50 | 0.57 | 0 | 92-66-57-47 |
| 1:1 | 0.50 | 0 | 0 | 125-95-83-68 |
| 1:1 | 0.50 | 0.57 | 0.5 | 76-40-28-17 |

[1]by weight water
[2]by weight cement

Herein, Fann readings refer to readings from a Fann viscometer where a Fann viscometer is an instrument used to measure the viscosity and gel strength of a cement slurry.

Foamed slurries containing 60:40 USG calcium sulfate hemi-hydrate:slag, 44% water by weight cement (bwc), the indicated amounts of lecithin and ZONESEAL 2000 were prepared and tested for heat of hydration as shown in Table 2.

TABLE 2

| ZONESEAL 2000 % bww | Lecithin % bww | Heat Rise (° C.) | Max Temperature (° C.) | Time to Max Temperature hours |
|---|---|---|---|---|
| 0 | 0 | 32.2 | 62.2 | 5.6 |
| 0 | 0.57 | 30.9 | 56.6 | 6 |
| 4[1] | 0 | 31.4 | 57.5 | 8.25 |
| 4[1] | 0.57 | 16 | 42.9 | 38.67 |
| 4[1] | 0.57 | 35 | 63 | 12[2] |

[1]9% foam quality
[2]Georgia Pacific Hemi-hydrate

The first two tests in Table 2 show that the addition of lecithin by itself does not appreciate lower or delay the time to reach maximum of hydration. However, when used in conjunction with ZONESEAL 2000 chemical additive used in cement foaming operations, which is a foaming agent commercially available from Halliburton Energy Services, the heat evolved is less and the time to reach the maximum temperature is significantly delayed. This did not hold true when slurries were prepared containing the calcium sulfate hemi-hydrate obtained from Georgia Pacific.

Example 2

A cement composition comprising hollow spheres as density reducing additives was prepared and the thickening time of the various compositions determined as shown in Table 3. The base cement composition was 60:40 GP hemi-hydrate:slag, 28% SPHERELITE bwc, 0.2% CFR-3 bwc cement dispersant, 0.57% bww (by weight of water) lecithin, 68.6% water bwc to a final density of 12 lb/gal. In some cases the slurries contained a sodium citrate set retarder, while in other cases HR-5 which is a lignosulfonate set retarder commercially available from Halliburton Energy Services was employed. In all compositions GP hemi-hydrate was used unless otherwise noted.

TABLE 3

| Retarder % bwc | Test Temperature (° F.) | Thickening Time hours:minutes |
|---|---|---|
| None | 80 | 0:10 |
| 0.3% sodium citrate | 80 | 5:53 |
| 0.1% sodium citrate | 60 | 15+ |
| 0.1% citric acid | 60 | 9:00 |
| 0.5% HR-5 | 80 | 1:46 |
| 0.5% HR-5 | 60 | 2:54 |
| 0.5% HR-5[1] | 80 | 7:44 |
| 0.2% HR-5[1] | 80 | 3:22 |

[1]USG hemi-hydrate/slag composition

SPHERELITE additive is a hollow inorganic sphere commercially available from Halliburton Energy Services. Sodium citrate was chosen as the retarder since it is used in permafrost cement. However, for the slag/hemi-hydrate composition, an addition level of 0.1% bwc had a thickening time in excess of 15 hours at 60° F. Therefore HR-5 was used which demonstrated a much more reasonable thickening time at this temperature.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference herein is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What is claimed is:

1. A method of servicing a wellbore in a subterranean formation, comprising:
   (a) preparing a cement composition comprising water, a cementitious material, and a gas hydrate inhibitor; and
   (b) placing the cement composition in the wellbore wherein the cement composition comprises cementitious material in an amount of from about 50% to about 80%.

2. The method of claim 1 wherein the gas hydrate inhibitor is lecithin.

3. The method of claim 2 wherein the cement composition comprises lecithin in an amount of from about 0.4% bww to about 1.0% bww.

4. The method of claim 1 wherein the cementitious material comprises Portland cement, pozzolana cements, gypsum cements, phosphate cements, high alumina content cements, silica cements, high alkalinity cements, or combinations thereof.

5. The method of claim 1 wherein the cement composition further comprises a set retarder.

6. The method of claim 1 further comprising foaming the cement composition.

7. The method of claim 1 wherein the cement composition further comprises a density-reducing additive.

8. The method of claim 7 wherein the density-reducing additive comprises glass beads, gas, or combinations thereof.

9. The method of claim 1 wherein the subterranean formation comprises permafrost, gas hydrates, or both.

10. A method of servicing a wellbore in a subterranean formation, comprising:
    (a) preparing a cement composition comprising water, a cementitious material, and a gas hydrate inhibitor; and
    (b) placing a cement composition in a wellbore wherein the cementitious material comprises blast furnace slag, vitrified shale, calcium sulfate hemi-hydrate or combinations thereof.

11. The method of claim 10 wherein the gas hydrate inhibitor is lecithin.

12. A method of servicing a wellbore in a subterranean formation, comprising:
    (a) preparing a cement composition comprising water, a cementitious material, and a gas hydrate inhibitor; and
    (b) placing the cement composition in the wellbore wherein the cementitious material comprises blast furnace slag and calcium sulfate hemi-hydrate in a ratio of from about 1:4 to about 4:1.

13. The method of claim 12 wherein the gas hydrate inhibitor is lecithin.

14. A method of servicing a wellbore in a subterranean formation, comprising:
    (a) preparing a cement composition comprising water, a cementitious material, and a gas hydrate inhibitor; and
    (b) placing the cement composition in the wellbore, wherein the cementitious material comprises blast furnace slag in an amount of from about 20% to about 80%.

15. The method of claim 14 wherein the gas hydrate inhibitor is lecithin.

16. A method of servicing a wellbore in a subterranean formation, comprising:
    (a) preparing a cement composition comprising water, a cementitious material, and a gas hydrate inhibitor; and
    (b) placing the cement composition in the wellbore, wherein the cementitious material comprises vitrified shale in an amount of from about 35% to about 65%.

17. The method of claim 16 wherein the gas hydrate inhibitor is lecithin.

18. A method of servicing a wellbore in a subterranean formation, comprising:
    (a) preparing a cement composition comprising water, a cementitious material, and a gas hydrate inhibitor; and
    (b) placing the cement composition in the wellbore, wherein the cementitious material comprises calcium sulfate hemi-hydrate in an amount of from about 20% to about 80%.

19. The method of claim 18 wherein the gas hydrate inhibitor is lecithin.

20. A method of servicing a wellbore in a subterranean formation, comprising:
    (a) preparing a cement composition comprising water, a cementitious material, and a gas hydrate inhibitor; and
    (b) placing the cement composition in the wellbore, wherein the cement composition further comprises a set retarder and wherein the set retarder comprises sodium citrate.

21. The method of claim 20 wherein the gas hydrate inhibitor is lecithin.

* * * * *